United States Patent
Hasegawa et al.

(10) Patent No.: US 6,207,774 B1
(45) Date of Patent: *Mar. 27, 2001

(54) PROCESS FOR PRODUCING ETHYLENE/α-OLEFIN COPOLYMER

(75) Inventors: Saiki Hasegawa, Yokkaichi; Makoto Sone; Hisami Yasuda, both of Mie-ken; Akihiro Yano, Yokkaichi, all of (JP)

(73) Assignee: Tosoh Corporation, Shinnanyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/946,857

(22) Filed: Oct. 8, 1997

Related U.S. Application Data

(63) Continuation of application No. 08/632,885, filed on Apr. 16, 1996, now abandoned, which is a continuation of application No. 08/198,577, filed on Feb. 18, 1994, now abandoned.

(30) Foreign Application Priority Data

Feb. 22, 1993 (JP) .................................................... 5-032007

(51) Int. Cl.$^7$ ...................................................... C08F 4/64
(52) U.S. Cl. ......................... 526/160; 526/132; 526/133; 526/348; 526/943
(58) Field of Search .................................... 526/132, 133, 526/160, 348, 943

(56) References Cited

U.S. PATENT DOCUMENTS 5,408,017 * 4/1995 Turner et al. ........................ 526/160

FOREIGN PATENT DOCUMENTS 0 426 638  5/1991  (EP) .
0 513 380  11/1992  (EP) .

OTHER PUBLICATIONS

Die Makromolekulare Chemie, Rapid Communications, vol. 14, No. 2, Feb. 1993, James C.W. Chien, "Olefin Copolymerization and Olefin/Diene Terpolymerization with a Zirconocenium Catalyst System", pp. 109–114.

* cited by examiner

Primary Examiner—David W. Wu
Assistant Examiner—Caìxìa Lu
(74) Attorney, Agent, or Firm—Oblon, Spivak, McClelland, Maier & Neustadt, P.C.

(57) ABSTRACT

An ethylene/α-olefin copolymer of a weight-average molecular weight of not less than 40000 is produced by copolymerization of ethylene with an α-olefin having three or more carbons by use of an olefin polymerization catalyst at a polymerization temperature of not lower than 120° C., the olefin polymerization catalyst comprising, as constitutional components, a) a metallocene compound, b) an ionizing ionic compound, and c) an organoaluminum compound, the ionizing ionic compound (b) being a compound which is capable of changing the metallocene compound (a) into a cationic form and does not further react the cationic form of the metallocene compound. This process produces an ethylene/α-olefin copolymer of high molecular weight in high efficiency.

13 Claims, 1 Drawing Sheet

PROCESS FOR PRODUCING ETHYLENE/α-OLEFIN COPOLYMER

This application is a Continuation of application Ser. No. 08/632,885 filed on Apr. 16, 1996, now abandoned, which is a continuation of Ser. No. 08/198,577 filed Feb. 18, 1994, abandoned.

BACKGROUND OF THE INVENTION

1. Field of the Invention

The present invention relates to a process for producing an ethylene/α-olefin copolymer of a high-molecular weight with an olefin polymerization catalyst constituted of a metallocene compound, an organoaluminum compound, and an ionizable ionic compound.

2. Description of the Related Art

The low-pressure Ziegler process for polymerization of ethylene or an α-olefin is well known in the related technical fields. The catalyst for the process is generally prepared by treating a mixture of an organometallic compound or hydride of a metal of Group 1A to 3A of Periodic Table with a compound of a transition metal (Group 3B to 2B of Periodic Table) in a suspension or a solution, or in the absence of a solvent or a diluent.

In recent years, other special kinds of catalysts are being developed which are active in olefin polymerization. Examples of the catalysts are combination of a cyclopentadienyl derivative of a metal such as titanium, zirconium, and hafnium (Group 4B of Periodic Table) with aluminoxane. (See, for example, J. Boor: "Ziegler-Natta Catalyst and Polymerization", Academic Press, New York (1979), and H. Sinn and W. Kaminsky: Adv. Organomet. Chem. 1899 (1980).) These catalysts have ability of forming a stereospecific olefin polymer with high catalyst activity. Japanese Patent Application Laid-Open No. 1-503788 describes a high-pressure high-temperature process for producing ethylene/α-olefin copolymer by use of a transition metal compound and an aluminoxane as the catalyst.

Nevertheless, such catalysts have not been used industrially mainly because of the following reasons: the aluminoxane cannot readily be produced in a reproducible form, hindering preparation of the catalyst and the polymer with required reproducibility, and the expensive aluminoxane has to be used in a considerably high ratio to the transition metal compound to achieve sufficient activity.

To offset the above disadvantages, Japanese Patent Laid-Open No. 3-207704 discloses ionic metallocene compound prepared by reacting a metallocene with an ionizing ionic compound. PCT Application No. WO 92-1723 discloses a process of α-olefin polymerization by use of a catalyst system prepared by reacting a halogenated metallocene with an organometallic compound and then bringing the reaction product into contact with an ionizing ionic compound. This catalyst system is advantageous in olefin polymerization. However, when ethylene and α-olefin are copolymerized by use of such a catalyst system at a high temperature, the resulting copolymer has a low molecular weight disadvantageously.

The inventors of the present invention made comprehensive studies to solve the above problems, and found that an ethylene/α-olefin copolymer having a high molecular weight is obtained with a high catalyst activity by copolymerizing ethylene with α-olefin by use of a specific ionic metallocene catalyst at a temperature of not lower than 120° C. The present invention has been accomplished based on the above findings.

SUMMARY OF THE INVENTION

The present invention intends to provide a process for producing an ethylene/α-olefin copolymer of high molecular weight with high efficiency at a high temperature.

The present invention provides a process for producing an ethylene/α-olefin copolymer of a weight-average molecular weight (Mw) of not less than 40000 by copolymerization of ethylene with an α-olefin having three or more carbons by use of an olefin polymerization catalyst at a polymerization temperature of not lower than 120° C.: the olefin polymerization catalyst comprising, as constitutional components, a) a metallocene compound, b) an ionizing ionic compound, and c) an organoaluminum compound:
the metallocene compound (a) being a compound represented by the general formula (1):

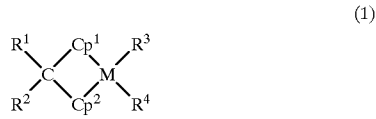

(1)

wherein $Cp^1$ and $Cp^2$ are independently a substituted or unsubstituted cyclopentadienyl, indenyl, or fluorenyl group; $R^1$ and $R^2$ are independently a substituted or unsubstituted alkyl group, a substituted or unsubstituted alkoxy group, a substituted or unsubstituted aryl group, or a hydrogen atom; M is titanium or zirconium; $R^3$ and $R^4$ are independently a hydrogen atom, a halogen atom, a hydrocarbon group of 1 to an alkoxy group, or an aryloxy group, 12 carbons, the ionizing ionic compound (b) being a compound which is capable of changing the metallocene compound (a) into a cationic form and does not further react the cationic form of the metallocene compound, and the organoaluminum compound (c) being represented by the general formula (2):

(2)

wherein $R^5$, $R^{5'}$, and $R^{5''}$ are independently a hydrogen atom, a halogen atom, an amino group, an alkyl group, an alkoxy group, or an aryl group, at least one thereof being an alkyl group.

DETAILED DESCRIPTION OF THE PREFERRED EMBODIMENT

Figure 1:
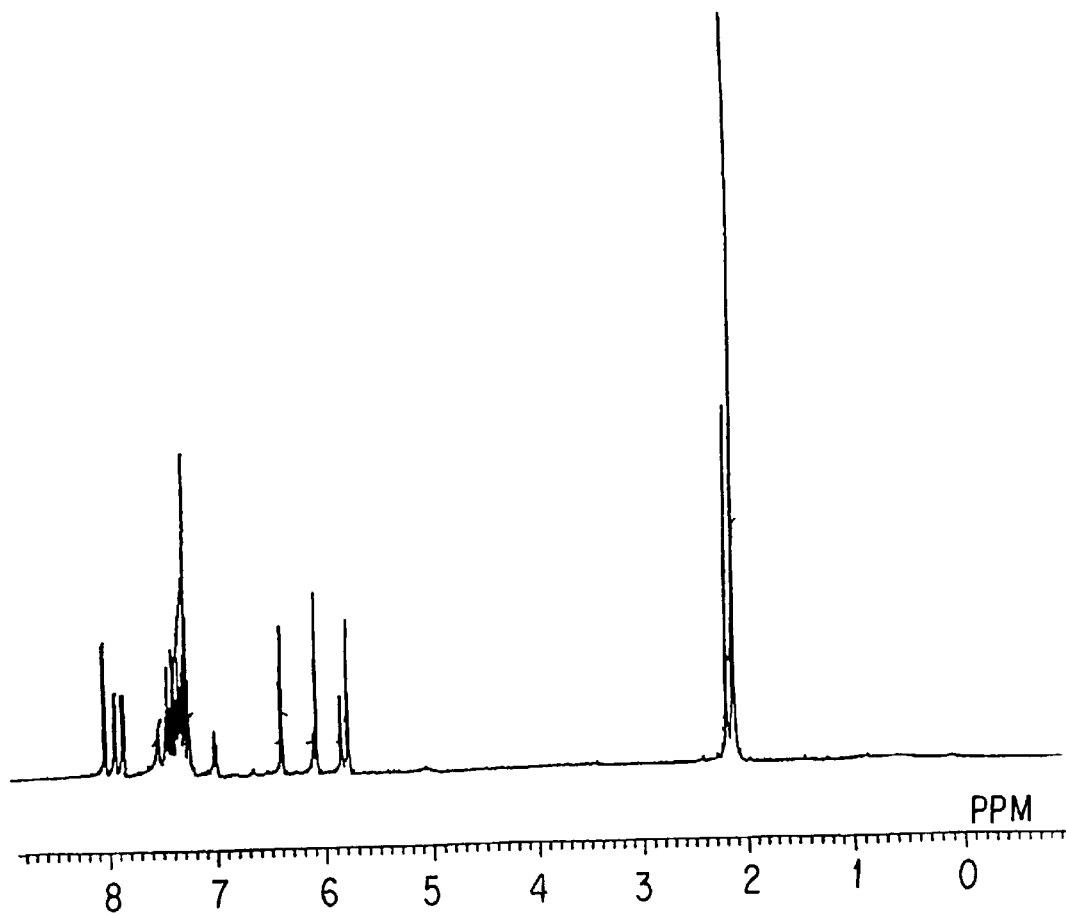
FIG. 1 is a $^1$H-NMR spectrum chart of diphenylmethylene (cyclopentadienyl)(2,7-dimethylfluorenyl)-zirconium dichloride synthesized in Example 10.

The metallocene compound (a) used in the present invention is represented by the general formula (1). The metallocene compound is exemplified specifically by
isopropylidene(cyclopentadienyl)(fluorenyl)titanium dichloride,
isopropylidene(cyclopentadienyl)(fluorenyl)zirconium dichloride,
diphenylmethylene(cyclopentadienyl)(fluorenyl)titanium dichloride,
diphenylmethylene(cyclopentadienyl)(fluorenyl)zirconium dichloride, methylphenylmethylene(cyclopentadienyl)(fluorenyl) titanium dichloride,
methylphenylmethylene(cyclopentadienyl)(fluorenyl) zirconium dichloride,
isopropylidene(cyclopentadienyl)(2,7-di-t-butylfluorenyl)-titanium dichloride,
isopropylidene(cyclopentadienyl)(2,7-di-t-butylfluorenyl)-zirconium dichloride,
diphenylmethylene(cyclopentadienyl)(2,7-di-t-butylfluorenyl)titanium dichloride,
diphenylmethylene(cyclopentadienyl)(2,7-di-t-butylfluorenyl)zirconium dichloride,
methylphenylmethylene(cyclopentadienyl)(2,7-di-t-butylfluorenyl)titanium dichloride,
methylphenylmethylene(cyclopentadienyl)(2,7-di-t-butylfluorenyl)zirconium dichloride,
isopropylidene(cyclopentadienyl)(2,7-dimethylfluorenyl)-titanium dichloride,
isopropylidene(cyclopentadienyl)(2,7-dimethylfluorenyl)-zirconium dichloride,
diphenylmethylene(cyclopentadienyl)(2,7-dimethylfluorenyl)-titanium dichloride,
diphenylmethylene(cyclopentadienyl)(2,7-dimethylfluorenyl)-zirconium dichloride,
methylphenylmethylene(cyclopentadienyl)(2,7-dimethylfluorenyl)titanium dichloride,
methylphenylmethylene(cyclopentadienyl)(2,7-dimethylfluorenyl)zirconium dichloride,
isopropylidene(cyclopentadienyl)(2,7-diphenylfluorenyl)-titanium dichloride,
isopropylidene(cyclopentadienyl)(2,7-diphenylfluorenyl)-zirconium dichloride,
diphenylmethylene(cyclopentadienyl)(2,7-diphenylfluorenyl)-titanium dichloride,
diphenylmethylene(cyclopentadienyl)(2,7-diphenylfluorenyl)-zirconium dichloride,
methylphenylmethylene(cyclopentadienyl)(2,7-diphenylfluorenyl)titanium dichloride, ,
methylphenylmethylene(cyclopentadienyl)(2,7-diphenylfluorenyl)zirconium dichloride,
isopropylidene(cyclopentadienyl)(a,i-dibenzofluorenyl)-titanium dichloride,
isopropylidene(cyclopentadienyl)(a,i-dibenzofluorenyl)-zirconium dichloride,
diphenylmethylene(cyclopentadienyl)(a,i-dibenzofluorenyl)-titanium dichloride,
diphenylmethylene(cyclopentadienyl)(a,i-dibenzofluorenyl)-zirconium dichloride,
methylphenylmethylene(cyclopentadienyl)(a,i-dibenzofluorenyl)titanium dichloride,
methylphenylmethylene(cyclopentadienyl)(a,i-dibenzofluorenyl)zirconium dichloride,
isopropylidene(cyclopentadienyl)(b,h-dibenzofluorenyl)-titanium dichloride,
isopropylidene(cyclopentadienyl)(b,h-dibenzofluorenyl)-zirconium dichloride,
diphenylmethylene(cyclopentadienyl)(b,h-dibenzofluorenyl)-titanium dichloride,
diphenylmethylene(cyclopentadienyl)(b,h-dibenzofluorenyl)-zirconium dichloride,
methylphenylmethylene(cyclopentadienyl)(b,h-dibenzofluorenyl)titanium dichloride,
methylphenylmethylene(cyclopentadienyl)(b,h-dibenzofluorenyl)zirconium dichloride,
bis(4-methylphenyl)methylene(cyclopentadienyl)(fluorenyl)-titanium dichloride,
bis(4-methylphenyl)methylene(cyclopentadienyl)(fluorenyl)-zircoium dichloride,
bis(4-phenylphenyl)methylene(cyclopentadienyl)(fluorenyl)-titanium dichloride,
bis(4-phenylphenyl)methylene(cyclopentadienyl)(fluorenyl)-zircoium dichloride,
isopropylidenebis(cyclopentadienyl)titanium dichloride,
isopropylidenebis(cyclopentadienyl)zirconium dichloride,
diphenylmethylenebis(cyclopentadienyl)titanium dichloride,
diphenylmethylenebis(cyclopentadienyl)zirconium dichloride,
methylphenylmethylenebis(cyclopentadienyl)titanium dichloride,
methylphenylmethylenebis(cyclopentadienyl)zirconium dichloride,
isopropylidene(cyclopentadienyl)(tetramethyl-cyclopentadienyl)titanium dichloride,
isopropylidene(cyclopentadienyl)(tetramethyl-cyclopentadienyl)zirconium dichloride,
diphenylmethylene(cyclopentadienyl)(tetramethyl-cyclopentadienyl)titanium dichloride,
diphenylmethylene(cyclopentadienyl)(tetramethyl-cyclopentadienyl)zirconium dichloride,
isopropylidenebis(indenyl)titanium dichloride,
isopropylidenebis(indenyl)zirconium dichloride,
diphenylmethylenebis(indenyl)titanium dichloride,
diphenylmethylenebis(indenyl)zirconium dichloride,
methylphenylmethylenebis(indenyl)titanium dichloride,
methylphenylmethylenebis(indenyl)zirconium dichloride, and the like.

For efficient copolymerization, the metallocene compounds are preferred in which the substituent $Cp^2$ is a substituted or unsubstituted fluorenyl group, and/or at least one of the substituents $R^1$ and $R^2$ is a substituted or unsubstituted aryl group.

The ionizing ionic compound (b) used in the present invention is a compound which is capable of changing the aforementioned metallocene compound (a) into a cationic form, and does not reacts further the formed cationic metallocene compound. The ionizing ionic compound is exemplified specifically by boron compounds such as
tri(n-butyl)ammonium tetrakis(p-tolyl)borate,
tri(n-butyl)ammonium tetrakis(m-tolyl)borate,
tri(n-butyl)ammonium tetrakis(2,4-dimetylphenyl)borate,
tri(n-butyl)ammonium tetrakis(3,5-dimethylphenyl)borate,
tri(n-butyl)ammonium tetrakis(pentafluorophenyl)borate,
N,N-dimethylanilinium tetrakis(p-tolyl)borate,
N,N-dimethylanilinium tetrakis(m-tolyl)borate,
N,N-dimethylanilinium tetrakis(2,4-dimetylphenyl)borate,
N,N-dimethylanilinium tetrakis(3,5-dimethylphenyl)borate,
N,N-dimethylanilinium tetrakis(pentafluorophenyl)borate,
triphenylcarbenium tetrakis(p-tolyl)borate,
triphenylcarbenium tetrakis(m-tolyl)borate,
triphenylcarbenium tetrakis(2,4-dimetylphenyl)borate,
triphenylcarbenium tetrakis(3,5-dimethylphenyl)borate,
triphenylcarbenium tetrakis(pentafluorophenyl)borate,
tropylium tetrakis(p-tolyl)borate,
tropylium tetrakis(m-tolyl)borate,
tropylium tetrakis(2,4-dimetylphenyl)borate,
tropylium tetrakis(3,5-dimethylphenyl)borate,
tropylium tetrakis(pentafluorophenyl)borate,
lithium tetrakis(pentafluorophenyl)borate,
lithium tetrakis(phenyl)borate,
lithium tetrakis(p-tolyl)borate,
lithium tetrakis(m-tolyl)borate,
lithium tetrakis(2,4-dimetylphenyl)borate,
lithium tetrakis(3,5-dimethylphenyl)borate,
lithium tetrafluoroborate, sodium tetrakis(pentafluorophenyl)borate,
sodium tetrakis(phenyl)borate,
sodium tetrakis(p-tolyl)borate,
sodium tetrakis(m-tolyl)borate,
sodium tetrakis(2,4-dimetylphenyl)borate,
sodium tetrakis(3,5-dimethylphenyl)borate,
sodium tetrafluoroborate,
potassium tetrakis(pentafluorophenyl)borate,
potassium tetrakis(phenyl)borate,
potassium tetrakis(p-tolyl)borate,
potassium tetrakis(m-tolyl)borate,
potassium tetrakis(2,4-dimetylphenyl)borate,
potassium tetrakis(3,5-dimethylphenyl)borate, and
potassium tetrafluoroborate;
aluminum compounds such as
    tri(n-butyl)ammonium tetrakis(p-tolyl)aluminate,
    tri(n-butyl)ammonium tetrakis(m-tolyl)aluminate,
    tri(n-butyl)ammonium tetrakis(2,4-dimetylphenyl)aluminate,
    tri(n-butyl)ammonium tetrakis(3,5-dimethylphenyl)aluminate,
    tri(n-butyl)ammonium tetrakis(pentafluorophenyl)aluminate,
    N,N-dimethylanilinium tetrakis(p-tolyl)aluminate,
    N,N-dimethylanilinium tetrakis(m-tolyl)aluminate,
    N,N-dimethylanilinium tetrakis(2,4-dimetylphenyl)aluminate,
    N,N-dimethylanilinium tetrakis(3,5-dimethylphenyl)aluminate,
    N,N-dimethylanilinium tetrakis(pentafluorophenyl)aluminate,
    triphenylcarbenium tetrakis(p-tolyl)aluminate,
    triphenylcarbenium tetrakis(m-tolyl)aluminate,
    triphenylcarbenium tetrakis(2,4-dimetylphenyl)aluminate,
    triphenylcarbenium tetrakis(3,5-dimethylphenyl)aluminate,
    triphenylcarbenium tetrakis(pentafluorophenyl)aluminate,
    tropylium tetrakis(p-tolyl)aluminate,
    tropylium tetrakis(m-tolyl)aluminate,
    tropylium tetrakis(2,4-dimetylphenyl)aluminate,
    tropylium tetrakis(3,5-dimethylphenyl)aluminate,
    tropylium tetrakis(pentafluorophenyl)aluminate,
    lithium tetrakis(pentafluorophenyl)aluminate,
    lithium tetrakis(phenyl)aluminate,
    lithium tetrakis(p-tolyl)aluminate,
    lithium tetrakis(m-tolyl)aluminate,
    lithium tetrakis(2,4-dimetylphenyl)aluminate,
    lithium tetrakis(3,5-dimethylphenyl)aluminate,
    lithium tetrafluoroaluminate,
    sodium tetrakis(pentafluorophenyl)aluminate,
    sodium tetrakis(phenyl)aluminate,
    sodium tetrakis(p-tolyl)aluminate,
    sodium tetrakis(m-tolyl)aluminate,
    sodium tetrakis(2,4-dimetylphenyl)aluminate,
    sodium tetrakis(3,5-dimethylphenyl)aluminate,
    sodium tetrafluoroaluminate,
    potassium tetrakis(pentafluorophenyl)aluminate,
    potassium tetrakis(phenyl)aluminate,
    potassium tetrakis(p-tolyl)aluminate,
    potassium tetrakis(m-tolyl)aluminate,
    potassium tetrakis(2,4-dimetylphenyl)aluminate,
    potassium tetrakis(3,5-dimethylphenyl)aluminate, and
    potassium tetrafluoroaluminate; and the like, but is not limited thereto.

The organoaluminum compound (c) used in the present invention is a compound represented by the general formula (2), and exemplified specifically by aluminum compounds such as trimethylaluminum, triethylaluminum, triisopropylaluminum, diisopropylaluminum chloride, isopropylaluminum dichloride, tributylaluminum, triisobutylaluminum, diisobutylaluminum chloride, isobutylaluminum dichloride, tri(t-butyl)aluminum, di(t-butyl)aluminum chloride, t-butylaluminum dichloride, triamylaluminum, diamylaluminum chloride, amylaluminum dichloride, and the like, but is not limited thereto.

The catalyst may be prepared by mixing the metallocene compound (a), the ionizing ionic compound (b), and the organoaluminum compound (c) mentioned above, for example, in an inert solvent. The method of catalyst preparation is not limited thereto.

The amount of the ionizing ionic compound (b) is preferably in the range of from about 0.1 to 100 moles, more preferably from 0.5 to 30 moles, per mole of the metallocene compound (a).

The amount of the organoaluminum compound (c) is preferably in the range of from 1 to 10000 moles per mole of the metallocene compound (a), but is not limited thereto.

The α-olefin of 3 or more carbons used in the present invention includes propylene, 1-butene, 4-methyl-1-pentene, 1-hexene, 1-octene, and styrene, but is not limited thereto. The olefin may be a mixture of two or more thereof.

The process of polymerization includes solution polymerization processes and known high-temperature high-pressure processes.

In the solution polymerization, the polymerization temperature is preferably in the range of from 120° C. to 300° C., but is not limited thereto provided that the temperature is not lower than 120° C., and the polymerization pressure is preferably in the range of from atmospheric pressure to 200 kg/cm$^2$, but is not limited thereto.

In the high-pressure polymerization, the polymerization temperature is preferably in the range of from 120° C. to 300° C., but is not limited thereto provided that the temperature is not lower than 120° C., and the polymerization pressure is preferably in the range of from 300 to 3500 kg/cm$^2$, but is not limited thereto.

By the process described above, an ethylene/α-olefin copolymer is obtained which has a weight-average molecular weight (Mw) of not less than 40000.

The present invention is described below in more detail by reference to Examples without limiting the invention thereto.

The procedures of polymerization, reaction, and solvent purification were conducted in an inert atmosphere. The solvent used in the reaction was purified, dried, and/or deoxidized preliminarily in a conventional method. The compounds used in the reactions were synthesized and identified in conventional methods.

The weight-average molecular weight (Mw) of the ethylene/α-olefin copolymers obtained in Examples were measured by gel permeation chromatography (GPC) employing the apparatus of Model 150C made by Waters Co. with a column of TSK-GEL GMHHR-H(S) (made by Tosoh Corp.) and o-dichlorobenzene as the eluent at a temperature of 140° C. at a sample concentration of 7 mg in 10 ml of o-dichlorobenzene.

The number of branching of the obtained ethylene/α-olefin copolymers was measured by FT-IR (Model 5M, made by Nippon Bunko K.K.)

EXAMPLE 1

In a 1-liter reactor, was placed 600 ml of an aliphatic hydrocarbon (IP Solvent 1620, made by Idemitsu Petrochemical Co.) as the solvent. Thereto, 20 ml of hexene was added, and the reactor was kept at a temperature of 150° C. Ethylene was fed to the reactor at an ethylene pressure of 20 kg/cm$^2$.

Separately, in another vessel, 0.5 μmol of diphenylmethylene(cyclopentadienyl)(fluorenyl)zirconium dichloride was dissolved in toluene, and thereto a solution of triisobutylaluminum in toluene (triisobutyl aluminum concentration: 20% by weight) was added in an amount of 125 μmol in terms of aluminum. The mixture was stirred for one hour. This mixture was added to a solution of 1.0 μmol of N,N-dimethylanilinium tetrakis(pentafluorophenyl)borate in 1 ml of toluene and the mixture was stirred for 10 minutes. The resulting mixture was introduced into the aforementioned reactor with the aid of nitrogen pressure.

After the introduction of the mixture into the reactor, the content in the reactor was stirred at 1500 rpm by keeping the temperature at 150° C. for one hour to allow copolymerization to proceed. The obtained reaction product was dried in vacuo at 100° C. for 6 hours. Thereby an ethylene/hexene copolymer was obtained in a yield of 25 g. The weight-average molecular weight (Mw) and other measured data are shown in Table 1.

EXAMPLE 2

A copolymer was prepared in the same manner as in Example 1 except for the ethylene pressure of 6 kg/cm$^2$. The results are shown in Table 1.

EXAMPLE 3

A copolymer was prepared in the same manner as in Example 1 except that the polymerization was conducted at a temperature of 170° C. The results are shown in Table 1.

EXAMPLE 4

A copolymer was prepared in the same manner as in Example 1 except that 1.0 μmol of tropylium tetrakis(pentafluorophenyl)borate was used in place of N,N-dimethylanilium tetrakis(pentafluorophenyl)borate. The results are shown in Table 1.

EXAMPLE 5

A copolymer was prepared in the same manner as in Example 1 except that 1.0 μmol of triphenylcarbenium (pentafluorophenyl)borate was used in place of N,N-dimethylanilinium tetrakis(pentafluorophenyl)borate. The results are shown in Table 1.

EXAMPLE 6

A copolymer was prepared in the same manner as in Example 3 except that the hexene was added in an amount of 80 ml. The results are shown in Table 1.

EXAMPLE 7

A copolymer was prepared in the same manner as in Example 3 except that diphenylmethylene(cyclopentadienyl)-(fluorenyl)zirconium dichloride, triisobutyl aluminum, and N,N-dimethylanilinium tetrakis(pentafluorophenyl)borate were used respectively in amounts of 0.25 μmol, 62.5 μmol, and 0.5 μmol. The results are shown in Table 1.

EXAMPLE 8

A copolymer was prepared in the same manner as in Example 7 except that 20 ml of butene was used in place of hexene. The results are shown in Table 1.

EXAMPLE 9

A copolymer was prepared in the same manner as in Example 8 except that the butene was used in an amount of 70 ml. The results are shown in Table 1.

EXAMPLE 10

"Synthesis of diphenylmethylene(cyclopentadienyl)(2,7-dimetylfluorenyl)zirconium dichloride"

In 30 ml of THF, was dissolved 3.1 mmol of diphenyl (cyclopentadienyl)(2,7-dimethylfluorenyl)methane. The solution was cooled to −70° C. Thereto 6.8 mmol of n-butyllithium was added dropwise. The mixture was brought to room temperature, and was stirred at room temperature for one day. The THF was removed and the residue was washed with hexane to obtain an orange solid matter.

Separately, in another vessel, 25 ml of methyelne chloride was added to 3.1 mmol of zirconium tetrachloride, and the mixture was cooled to −70° C. Thereto a solution of the above orange solid matter in methyelne chloride was added, and the mixture was warmed to room temperature. The formed solid matter was removed from the solution by filtration. The filtrate was concentrated and cooled to −70° C. The precipitated crystalline matter was collected from the solution by filtration to obtain 1.0 g of orange-colored crystals of diphenylmethylene(cyclopentadienyl)-(2,7-dimethylfluorenyl)zirconium dichloride. The elemental analysis data and the $^1$H-NMR spectrum data are shown below.

Elemental Analysis: Calculated (% by weight) C: 67.8%, H: 4.5%, Cl: 12.1%; Found (% by weight) C: 66.5%, H: 4.8%, Cl: 11.9%; $^1$H-NMR spectrum (CDCl$_3$): 6.1–8.1 (16H, Flu-H, Ph-H), 5.8 (t, 2H, Cp-H), 6.4 (t, 2H, Cp-H), 2.1 (S, 6H, Me).

FIG. 1 shows the NMR spectrum chart.

"Polymerization"

In a 1-liter reactor, was placed 600 ml of an aliphatic hydrocarbon (IP Solvent 1620, made by Idemitsu Petrochemical Co.) as the solvent. Thereto, 20 ml of hexene was added, and the reactor was kept at a temperature of 170° C. Ethylene was fed to the reactor at an ethylene pressure of 20 kg/cm$^2$.

Separately, in another vessel, 0.25 μmol of diphenylmethylene(cyclopentadienyl)(2,7-dimethylfluorenyl)zirconium dichloride was dissolved in toluene, and thereto a solution of triisobutylaluminum in toluene (aluminum concentration: 20% by weight) was added in an amount of 62.5 μmol in terms of aluminum. The mixture was stirred for one hour. This mixture was added to a solution of 0.5 μmol of N,N-dimethylanilinium tetrakis(pentafluorophenyl)borate in 0.5 ml of toluene and the mixture was stirred for 10 minutes. The resulting mixture was introduced into the aforementioned reactor with the aid of nitrogen pressure.

After the introduction of the mixture into the reactor, the content in the reactor was stirred at 1500 rpm by keeping the temperature at 170° C. for one hour to allow copolymerization to proceed. The obtained reaction product was dried in vacuo at 100° C. for 6 hours. Thereby an ethylene/hexene copolymer was obtained in a yield of 34 g. The weight-average molecular weight (Mw) and other measured data are shown in Table 1.

EXAMPLE 11

"Synthesis of diphenylmethylene(cyclopentadienyl)(2,7-di-t-butylfluorenyl)zirconium dichloride"

In 30 ml of THF, was dissolved 10.6 mmol of diphenyl (cyclopentadienyl)(2,7-di-t-butylfluorenyl)methane. The solution was cooled to −70° C. Thereto 23.3 mmol of n-butyllithium was added dropwise. The mixture was brought to room temperature, and was stirred at room temperature for one day. Then the THF was removed, and the residue was washed with hexane to obtain an orange solid matter.

Separately, in another vessel, 50 ml of methyelne chloride was added to 10.6 mmol of zirconium tetrachloride, and the mixture was cooled to −70° C. Thereto a solution of the above orange solid matter in methyelne chloride was added, and the mixture was warmed to room temperature. The formed solid matter was removed from the solution by filtration. The filtrate was concentrated and was cooled to −70° C. The precipitated crystalline matter was collected from the solution by filtration to obtain 3.0 g of orange-colored crystals of diphenylmethylene(cyclopentadienyl)-(2,7-di-t-butylfluorenyl)zirconium dichloride. The elemental analysis data and the $^1$H-NMR spectrum data are shown below.

Elemental Analysis: Calculated (% by weight) C: 70.0%, H: 5.7%, Cl: 10.6%; Found (% by weight) C: 69.3%, H: 6.2%, Cl: 11.3%; $^1$H-NMR spectrum (CDCl$_3$): 6.4–8.1 (16H, Flu-H, Ph-H), 5.8 (t, 2H, Cp-H), 6.4 (t, 2H, Cp-H), 1.2 (S, 18H, tBu).

"Polymerization"

In a 1-liter reactor, was placed 600 ml of an aliphatic hydrocarbon (IP Solvent 1620, made by Idemitsu Petrochemical Co.) as the solvent. Thereto, 20 ml of hexene was added, and the reactor was kept at a temperature of 170° C. Ethylene was fed to the reactor at an ethylene pressure of 20 kg/cm$^2$.

Separately, in another vessel, 0.25 μmol of diphenylmethylene(cyclopentadienyl)(2,7-di-t-butylfluorenyl)zirconium dichloride was dissolved in toluene, and thereto a solution of triisobutylaluminum in toluene (aluminum concentration: 20% by weight) was added in an amount of 62.5 μmol in terms of aluminum. The mixture was stirred for one hour. This mixture was added to a solution of 0.5 μmol of N,N-dimethylanilinium tetrakis-(pentafluorophenyl)borate in 0.5 ml of toluene and the mixture was stirred for 10 minutes. The resulting mixture was introduced into the aforementioned reactor with the aid of nitrogen pressure.

After the introduction of the mixture into the reactor, the content in the reactor was stirred at 1500 rpm by keeping the temperature at 170° C. for one hour to allow copolymerization to proceed. The obtained reaction product was dried in vacuo at 100° C. for 6 hours. Thereby an ethylene/hexene copolymer was obtained in a yield of 36 g. The weight-average molecular weight (Mw) and other measured data are shown in Table 1.

Comparative Example 1

In a 1-liter reactor, was placed 600 ml of an aliphatic hydrocarbon (IP Solvent 1620, made by Idemitsu Petrochemical Co.) as the solvent. Thereto, 20 ml of hexene was added, and the reactor was kept at a temperature of 150° C. Ethylene was fed to the reactor at an ethylene pressure of 20 kg/cm$^2$.

Separately, in an other r vessel, 1.0 μmol of ethylenebis (indenyl)zirconium dichloride was dissolved in toluene, and thereto a solution of triisobutylaluminum in toluene (aluminum concentration: 20% by weight) was added in an amount of 250 μmol in terms of aluminum. The mixture was stirred for one hour. This mixture was added to a solution of 2.0 μmol of N,N-dimethylanilinium tetrakis-(pentafluorophenyl)borate in 1 ml of toluene and the mixture was stirred for 10 minutes. The resulting mixture was introduced into the aforementioned reactor with the aid of nitrogen pressure.

After the introduction of the mixture into the reactor, the content in the reactor was stirred at 1500 rpm by keeping the temperature at 150° C. for one hour to allow copolymerization to proceed. The obtained reaction product was dried in vacuo at 100° C. for 6 hours. Thereby an ethylene/hexene copolymer was obtained in a yield of 40 g. The weight-average molecular weight (Mw) and other measured data are shown in Table 1.

Comparative Example 2

A copolymer was prepared in the same manner as in Comparative Example 1 except that the ethylene pressure was kept at 6 kg/cm$^2$.

Comparative Example 3

A copolymer was prepared in the same manner as in Comparative Example 1 except that the polymerization temperature was kept at 170°.

Comparative Example 4

A copolymer was prepared in the same manner as in Comparative Example 1 except that 1.0 μmol of bis (cyclopentadienyl)zirconium dichloride was used in place of 1.0 μmol of ethylenebis(indenyl)zirconium dichloride. The results are shown in Table 1.

Comparative Example 5

A copolymer was prepared in the same manner as in Comparative Example 1 except that 1.0 μmol of dimethylsilanediylbis(2,4-dimethylcyclopentadienyl) zirconium dichloride was used in place of 1.0 μmol of ethylenebis(indenyl)zirconium dichloride. The results are shown in Table 1.

EXAMPLE 12

A reactor for high-temperature high-pressure polymerization was employed for the polymerization. Ethylene and hexene were fed continuously with pressure to the reactor to keep the total pressure at 950 kg/cm$^2$ and the concentration of hexene at 31.4 mol %, and the reactor was stirred at 1500 rpm.

Separately, in another vessel, a solution of triisobutylaluminum in toluene was added to a solution of diphenylmethylene(cyclopentadienyl)(fluorenyl)zirconium dichloride in toluene at an aluminum-to-zirconium mole ratio of 250:1. Further thereto, a solution of N,N-dimethylanilinium tetrakis(pentafluorophenyl)borate in toluene was added at a boron-to-zirconium mole ratio of 2:1 to prepare the catalyst solution.

The resulting catalyst solution was continuously introduced into the reactor to allow the polymerization to proceed at the reactor temperature of 193° C. The results are shown in Table 2 and Table 3.

EXAMPLE 13

The polymerization was conducted in the same manner as in Example 12 except that the polymerization temperature was controlled to be at 180° C. and the hexene concentration was adjusted to 28.8 mol %. The results are shown in Table 2 and Table 3.

EXAMPLE 14

The polymerization was conducted in the same manner as in Example 12 except that the polymerization temperature was controlled to be at 165° C. and the hexene concentration was adjusted to 19.0 mol %. The results are shown in Table 2 and Table 3.

EXAMPLE 15

The polymerization was conducted in the same manner as in Example 13 except that tropylium tetrakis (pentafluorophenyl)borate was used in place of N,N-dimethylanilnium tetrakis(pentafluorophenyl)borate, and the hexene concentration was adjusted to 32.6 mol %. The results are shown in Table 2 and Table 3.

EXAMPLE 16

The polymerization was conducted in the same manner as in Example 15 except that the polymerization temperature was controlled to be at 165° C. and the hexene concentration was adjusted to 33.0 mol %. The results are shown in Table 2 and Table 3.

EXAMPLE 17

The polymerization was conducted in the same manner as in Example 14 except that triethylaluminum was used in place of triisobutylaluminum and the hexene concentration was adjusted to 33.5 mol %. The results are shown in Table 2 and Table 3 .

EXAMPLE 18

A reactor for high-temperature high-pressure polymerization was employed for the polymerization. Ethylene and hexene were fed continuously with pressure to the reactor to keep the total pressure at 1500 kg/cm$^2$ and the concentration of hexene at 41.2 mol %, and the reactor was stirred at 1500 rpm.

Separately, in another vessel, a solution of triisobutylaluminum in toluene was added to a solution of diphenylmethylene(cyclopentadienyl)(fluorenyl)zirconium dichloride in toluene at an aluminum-to-zirconium mole ratio of 250:1. Further thereto, a solution of N,N-dimethylanilinium tetrakis(pentafluorophenyl)borate in toluene was added at a boron-to-zirconium mole ratio of 1:1 to prepare the catalyst solution.

The resulting catalyst solution was introduced into the reactor to allow the polymerization to proceed continuously at the reactor temperature of 155° C. The results are shown in Table 2 and Table 3.

EXAMPLE 19

The copolymerization was conducted in the same manner as in Example 18 except that the polymerization temperature was controlled to 180° C., butene was used in place of hexene at a concentration of 39.4 mol %, and the pressure was controlled to 900 kg/cm$^2$. The results are shown in Table 2 and Table 3.

EXAMPLE 20

The copolymerization was conducted in the same manner as in Example 19 except that the polymerization temperature was controlled to 153° C., the butene concentration was adjusted to 53.9 mol %. The results are shown in Table 2 and Table 3.

EXAMPLE 21

The copolymerization was conducted in the same manner as in Example 19 except that diphenylmethylene (cyclopentadienyl)(2,7-di-t-butylfluorenyl)zirconium dichloride was used in place of diphenylmethylene (cyclopentadienyl)(fluorenyl)zirconium dichloride, the polymerization temperature was controlled to 150° C., and butene concentration was adjusted to 66.8 mol %. The results are shown in Table 2 and Table 3.

EXAMPLE 22

The copolymerization was conducted in the same manner as in Example 19 except that diphenylmethylene (cyclopentadienyl)(2,7-dimethylfluorenyl)zirconium dichloride was used in place of diphenylmethylene (cyclopentadienyl)(fluorenyl)zirconium dichloride, the polymerization temperature was controlled to 155° C., and hexene was used in place of butene at a concentration of 30.0 mol %. The results are shown in Table 2 and Table 3.

Comparative Example 6

The copolymerization was conducted in the same manner as in Example 12 except that ethylenebis(indenyl)zirconium dichloride was used in place of diphenylmethylene (cyclopentadienyl)(fluorenyl)zirconium dichloride, the polymerization temperature was controlled to 155° C., and the hexene concentration was adjusted to 32.0 mol %. The results are shown in Table 2 and Table 3.

The copolymerization of ethylene with α-olefin with a specified metallocene catalyst at a polymerization temperature of not lower than 120° C. enables production of a copolymer with high catalyst activity with high efficiency.

TABLE 1

| | Metallocene | Boron compound | Temperature (° C.) | -Olefin (ml) | Ethylene pressure (kg/cm$^2$) | Yield (g) | Mw | Mw/Mn | Melting point (° C.) | Number of branching (per 1000 C.) |
|---|---|---|---|---|---|---|---|---|---|---|
| Example | | | | | | | | | | |
| 1 | Zr-1 | B-1 | 150 | Hexene-1 20 | 20 | 25 | 75700 | 2.0 | 115 | 7.4 |
| 2 | Zr-1 | B-1 | 150 | Hexene-1 20 | 6 | 16 | 54700 | 1.9 | 104 | 21.7 |
| 3 | Zr-1 | B-1 | 170 | Hexene-1 20 | 20 | 11 | 56300 | 1.9 | 119 | 7.0 |
| 4 | Zr-1 | B-2 | 150 | Hexene-1 20 | 20 | 37 | 73500 | 1.9 | 115 | 7.3 |
| 5 | Zr-1 | B-3 | 150 | Hexene-1 20 | 20 | 12 | 77000 | 1.9 | 115 | 7.5 |
| 6 | Zr-1 | B-1 | 170 | Hexene-1 80 | 20 | 36 | 56300 | 1.9 | 100 | |

TABLE 1-continued

| | Metallocene | Boron compound | Temperature (° C.) | -Olefin (ml) | Ethylene pressure (kg/cm$^2$) | Yield (g) | Mw | Mw/Mn | Melting point (° C.) | Number of branching (per 1000 C.) |
|---|---|---|---|---|---|---|---|---|---|---|
| 7 | Zr-1 | B-1 | 170 | Hexene-1 20 | 20 | 30 | 49000 | 2.0 | 120 | |
| 8 | Zr-1 | B-1 | 170 | Butene-1 20 | 20 | 38 | 51200 | 1.8 | 122 | |
| 9 | Zr-1 | B-1 | 170 | Butene-1 70 | 20 | 22 | 48400 | 1.6 | 93 | |
| 10 | Zr-2 | B-1 | 170 | Hexene-1 20 | 20 | 34 | 66100 | 1.8 | 120 | |
| 11 | Zr-3 | B-1 | 170 | Hexene-1 20 | 20 | 36 | 67500 | 1.7 | 120 | |
| Comparative Example | | | | | | | | | | |
| 1 | Zr-4 | B-1 | 150 | Hexene-1 20 | 20 | 40 | 20400 | 2.2 | 124 | 5.9 |
| 2 | Zr-4 | B-1 | 150 | Hexene-1 20 | 6 | 26 | 15400 | 2.2 | 112 | 10.5 |
| 3 | Zr-4 | B-1 | 170 | Hexene-1 20 | 20 | 28 | 16500 | 2.0 | 124 | 6.3 |
| 4 | Zr-5 | B-1 | 150 | Hexene-1 20 | 20 | 24 | 14200 | 1.9 | 126 | 5.2 |
| 5 | Zr-6 | B-1 | 150 | Hexene-1 20 | 20 | 21 | 23500 | 2.0 | 124 | 5.4 |

Zr-1: Ph$_2$C(Cp)(Flu)ZrCl$_2$
Zr-2: Ph$_2$C(Cp)(2,7-di-Me-Flu)ZrCl$_2$
Zr-3: Ph$_2$C(Cp)(2,7-di-tBu-Flu)ZrCl$_2$
Zr-4: Et(inde)$_2$ZrCl$_2$
Zr-5: Cp$_2$ZrCl$_2$
Zr-6: Me$_2$Si(2,4-Me-Cp)$_2$ZrCl$_2$
B-1: Ph(Me)$_2$NH.B(C$_6$F$_5$)$_4$
B-2: C$_7$H$_7$.B(C$_6$F$_5$)$_4$
B-3: Ph$_3$C.B(C$_6$F$_5$)$_4$

TABLE 2

| | Polymerization temperature (° C.) | Metallocene | Boron compound | Aluminum compound | Zr/B/Al (molar ratio) | Zr catalyst concentration (μmol/l) | Ethylene pressure (kg/cm$^2$) | Comonomer (mol %) | Catalyst solution feed rate (cc/hr) |
|---|---|---|---|---|---|---|---|---|---|
| Example | | | | | | | | | |
| 12 | 193 | Zr-1 | B-1 | i-Bu$_3$Al | 1/2/250 | 650 | 950 | Hexene-1: 31.4 | 120 |
| 13 | 180 | Zr-1 | B-1 | i-Bu$_3$Al | 1/2/250 | 650 | 950 | Hexene-1: 28.8 | 120 |
| 14 | 165 | Zr-1 | B-1 | i-Bu$_3$Al | 1/2/250 | 300 | 950 | Hexene-1: 19.0 | 70 |
| 15 | 180 | Zr-1 | B-2 | i-Bu$_3$Al | 1/2/250 | 300 | 950 | Hexene-1: 32.6 | 205 |
| 16 | 165 | Zr-1 | B-2 | i-Bu$_3$Al | 1/2/250 | 300 | 950 | Hexene-1: 33.0 | 225 |
| 17 | 165 | Zr-1 | B-1 | Et$_3$Al | 1/2/250 | 300 | 950 | Hexene-1: 33.5 | 315 |
| 18 | 155 | Zr-1 | B-1 | i-Bu$_3$Al | 1/1/250 | 650 | 1500 | Hexene-1: 41.2 | 45 |
| 19 | 180 | Zr-1 | B-1 | i-Bu$_3$Al | 1/1/250 | 650 | 900 | Butene-1: 39.4 | 100 |
| 20 | 153 | Zr-1 | B-1 | i-Bu$_3$Al | 1/1/250 | 650 | 900 | Butene-1: 53.9 | 110 |
| 21 | 150 | Zr-3 | B-1 | i-Bu$_3$Al | 1/1/250 | 300 | 900 | Butene-1: 66.8 | 305 |
| 22 | 155 | Zr-2 | B-1 | i-Bu$_3$Al | 1/2/250 | 300 | 900 | Hexene-1: 30.0 | 140 |
| Comparative Example | | | | | | | | | |
| 6 | 155 | Zr-4 | B-1 | i-Bu$_3$Al | 1/2/250 | 650 | 950 | Hexene-1: 32.0 | 290 |

Zr-1: Ph$_2$C(Cp)(Flu)ZrCl$_2$
Zr-2: Ph$_2$C(Cp)(2,7-di-Me-Flu)ZrCl$_2$
Zr-3: Ph$_2$C(Cp)(2,7-di-tBu-Flu)ZrCl$_2$
Zr-4: Et(inde)$_2$ZrCl$_2$
B-1: Ph(Me)$_2$NH.B(C$_6$F$_5$)$_4$
B-2: C$_7$H$_7$.B(C$_6$F$_5$)$_4$

TABLE 3

| | Productivity (kg/hr) | Mw (× 10$^4$) | MWD | MFR (g/10 min) | Density (g/cm$^3$) | Melting point (° C.) |
|---|---|---|---|---|---|---|
| Example | | | | | | |
| 12 | 13.3 | 5.94 | 1.8 | 9.1 | 0.925 | 117 |
| 13 | 12.5 | 6.49 | 1.7 | 5.3 | 0.925 | 118 |
| 14 | 8.8 | 7.72 | 1.8 | 2.2 | 0.929 | 124 |
| 15 | 12.5 | 6.59 | 1.8 | 4.9 | 0.922 | 115 |
| 16 | 11.5 | 7.42 | 1.9 | 3.1 | 0.918 | 112 |
| 17 | 11.5 | 7.46 | 1.8 | 3.4 | 0.918 | 112 |
| 18 | 14.1 | 6.00 | 1.7 | 3.4 | 0.911 | 108 |
| 19 | 10.5 | 4.91 | 1.6 | 5.2 | 0.922 | 117 |
| 20 | 8.4 | 5.23 | 1.7 | 7.0 | 0.882 | 59 |
| 21 | 8.7 | 5.67 | 1.9 | 4.1 | 0.885 | 59 |
| 22 | 10.0 | 7.28 | 2.0 | 0.9 | 0.918 | 118 |
| Comparative Example | | | | | | |
| 6 | 26.2 | 3.72 | 2.0 | 70.0 | 0.932 | 124 |

What is claimed is:

1. A process for producing an ethylene/α-olefin copolymer of a weight-average molecular weight of not less than 40000 by copolymerization of ethylene with an α-olefin having three or more carbons by use of an olefin polymerization catalyst at a polymerization temperature of 120° C.–300° C.: the olefin polymerization catalyst comprising, a) a metallocene compound, b) an ionizing ionic compound and c) an organoaluminum compound: the metallocene compound (a) being a compound represented by the general formula $Ph_2C(Cp)(Flu)ZrCl_2$ wherein (Cp) is cyclopentadienyl, (Flu) is fluorenyl either unsubstituted or substituted (1) at at least one of the 2–7 positions by alkyl or aryl, or (2) at the 2,3 and 6,7 positions, or at the 1,2 and 7,8 positions, by benzene, the ionizing ionic compound (b) being a compound which is capable of changing the metallocene compound (a) into a cationic form and does not further react with the cationic form of the metallocene compound, and the organoaluminum compound (c) being represented by the general formula (2):

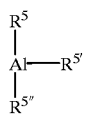

(2)

wherein $R^5$, $R^{5'}$, and $R^{5''}$ are independently an alkyl group,
wherein said ionizing ionic compound is a salt of an anion and a cation;
said cation is selected from the group consisting of tri(n-butyl)ammonium, N,N-dimethylanilinium, triphenylcarbenium, tropylium, lithium, sodium and potassium;
said anion is tetrakis(pentafluorophenyl)borate, and;
wherein the metallocene compound (a) and the organoaluminum compound (c) are present in a ratio of 100–10,000 moles of the organoaluminum compound per mole of the metallocene, and the ionizing ionic compound (b) and the metallocene compound (a) are present in a ratio of 0.1–100 moles of the ionizing ionic compound per mole of the metallocene, wherein said copolymerization is a solution polymerization at a polymerization pressure of from atmospheric pressure to 200 kg/cm² or a high-pressure polymerization at a polymerization pressure of from 300 to 3500 kg/cm², and wherein the amount of ethylene monomer is 33.2 to 81.0 mol % based on the amount of copolymer.

2. The process of claim 1, wherein said organoaluminum compound (c) is selected from the group consisting of trimethylaluminum, triethylaluminum, triisopropylaluminum, diisopropylaluminum chloride, isopropylaluminum dichloride, tributylaluminum, triisobutylaluminum, diisobutylaluminum chloride, isobutylaluminum dichloride, tri(t-butyl)aluminum, di(t-butyl)aluminum chloride, t-butylaluminum dichloride, triamylaluminum, diamylaluminum chloride and amylaluminum dichloride.

3. The process of claim 1, wherein the ionizing ionic compound (b) is used in a ratio of 0.5–30 moles of the ionizing ionic compound per mole of the metallocene.

4. The process of claim 1, wherein said α-olefin is selected from the group consisting of propylene, 1-butene, 4-methyl-l-pentene, 1-hexene, 1-octene, styrene and mixtures thereof.

5. The process of claim 1, wherein the metallocene compound (a) is mixed with the organoaluminum compound (c), in a ratio of 100–250 moles of the organoaluminum compound per mole of the metallocene.

6. The process of claim 1, wherein the ionizing ionic compound (b) is used in a ratio of 0.1–2 moles of the ionizing ionic compound per mole of the metallocene.

7. The process of claim 1, wherein the ionizing ionic compound (b) is used in a ratio of 1–2 moles of the ionizing ionic compound per mole of the metallocene.

8. The process of claim 1, wherein the ionizing ionic compound (b) is used in a ratio of 1–100 moles of the ionizing ionic compound per mole of the metallocene.

9. The process of claim 1, wherein the polymerization is a solution polymerization and is carried out a pressure in the range of from atmospheric pressure to 200 kg/cm².

10. The process of claim 1, wherein the polymerization is a high pressure polymerization and is carried out at a pressure of from 300 to 3500 kg/cm².

11. The process of claim 1, wherein the metallocene compound is diphenylmethylene(cyclopentadienyl)(fluorenyl)zirconium dichloride.

12. The process of claim 1, wherein the metallocene compound is diphenylmethylene(cyclopentadienyl)(2,7-dimethylfluorenyl)zirconium dichloride.

13. The process of claim 1, wherein the metallocene compound is diphenylmethylene(cyclopentadienyl)(2,7-ditertbutylfluorenyl)zirconium dichloride.

* * * * *